United States Patent
Cunningham

(10) Patent No.: US 6,745,659 B1
(45) Date of Patent: Jun. 8, 2004

(54) HEAD RAIL HOLDER EXTENSION

(76) Inventor: John E. Cunningham, 26 Hird St., Niagara Falls, NY (US) 14304

( * ) Notice: Subject to any disclaimer, the term of this patent is extended or adjusted under 35 U.S.C. 154(b) by 165 days.

(21) Appl. No.: 09/757,843

(22) Filed: Jan. 10, 2001

(51) Int. Cl.[7] .............................. B26D 7/27
(52) U.S. Cl. ............. 83/522.19; 83/468.7; 83/465; 269/304; 29/24.5; 33/568
(58) Field of Search .............. 83/468, 468.6, 83/468.7, 464, 465, 403, 522.17, 762, 522.19, 452; 269/290, 291, 292, 303, 304, 298, 300, 56, 295, 307; 33/628, 630, 436, 568, 549, 571, 573; 29/24.5

(56) References Cited

U.S. PATENT DOCUMENTS

| | | | | |
|---|---|---|---|---|
| 856,403 A | * | 6/1907 | Hubbard et al. | 83/468 |
| 1,745,815 A | * | 2/1930 | Schoepfle | 83/468 |
| 2,134,332 A | * | 10/1938 | Hubbard | 83/762 |
| 2,489,467 A | | 11/1949 | Sherwood | |
| 2,644,520 A | * | 7/1953 | Nelson | 83/198 |
| 2,779,360 A | * | 1/1957 | Snow | 269/315 |
| 2,789,639 A | * | 4/1957 | Lorentzen | 83/13 |
| 3,766,815 A | | 10/1973 | Edixhoven | 83/160 |
| 4,322,066 A | * | 3/1982 | Disney | 269/304 |
| 4,693,158 A | * | 9/1987 | Price | 83/468 |
| 4,712,462 A | * | 12/1987 | Cvek | 83/762 |
| 4,819,530 A | | 4/1989 | Huang | 83/39 |
| 4,993,131 A | | 2/1991 | Graves et al. | 29/24.5 |
| 5,072,494 A | | 12/1991 | Graves et al. | 29/24.5 |
| 5,136,909 A | * | 8/1992 | Mellick | 83/762 |
| 5,339,716 A | | 8/1994 | Sands et al. | 83/452 |
| 5,456,149 A | | 10/1995 | Elsenheimer et al. | 83/564 |
| 5,692,734 A | | 12/1997 | Aldredge, Sr. | 269/166 |
| 5,791,222 A | | 8/1998 | Micouleau | 83/375 |
| 5,799,557 A | * | 9/1998 | Wang | 83/639.5 |
| 5,806,394 A | | 9/1998 | Marocco | 83/197 |
| 5,816,126 A | | 10/1998 | Pluber | 83/167 |
| 5,927,172 A | | 7/1999 | Wang | 83/454 |
| 6,003,217 A | * | 12/1999 | Graves et al. | 29/24.5 |
| 6,003,218 A | | 12/1999 | Schumann et al. | 29/24.5 |
| 6,079,306 A | | 6/2000 | Liu | 83/454 |
| 6,089,134 A | | 7/2000 | Marocco | 83/197 |
| 6,412,381 B1 | * | 7/2002 | Wang et al. | 83/454 |

FOREIGN PATENT DOCUMENTS

GB  2248869  4/1992

* cited by examiner

*Primary Examiner*—Boyer Ashley
*Assistant Examiner*—Thomas J Druan, Jr
(74) *Attorney, Agent, or Firm*—Hodgson Russ LLP

(57) ABSTRACT

A head rail holder extension for use with a blind trimming machine having a horizontal support member defining a pathway for a sliding stabilizer block. The sliding stabilizer block is adapted to move along the pathway and is adapted to be locked at positions along the length of the pathway. A channel-shaped member with an opening is attached to the stabilizer block. An adjustable stop is disposed adjacent to the channel shaped member such that the adjustable stop can be moved into a first position where it blocks the opening and a second position where it allows the head rail to extend beyond the stop.

10 Claims, 2 Drawing Sheets

HEAD RAIL HOLDER EXTENSION

FIELD OF INVENTION

The present invention relates to head rail holders for custom trimming of head rails for blinds.

BACKGROUND OF THE INVENTION

Many stores that sell blinds have machines for customizing vertical blinds so that the customer does not have to wait for a custom order from a factory. In warehouse stores, it is often convenient to locate the blind trimming machine in a structural rack on the same aisle as the blinds. The width of the span between the ends of a structural rack is a limitation on the length of the head rails that can be cut by standard trimming machines. Presently, the limit is usually seventy-eight inches in length. However, there is a need for custom cutting of blinds having head rails up to one-hundred four inches in length or longer.

SUMMARY OF THE INVENTION

The present invention meets the above-described need by providing an extended head rail holder that provides for cutting longer head rails on existing blind trimming machines within the span of existing structural racks.

In a first aspect, the invention includes a head rail holder extension that is mounted to the sliding stabilizer block of the blind trimming machine. The blind trimming machines have a horizontal support member that forms a pathway for the stabilizer block between a bottom wall and a pair of opposed side walls. The sliding stabilizer block is adapted to move along the pathway and is adapted to be locked at positions along the length of the horizontal support surface by a cam. The head rail holder extension includes a channel-shaped member for holding the head rail. An adjustable stop is disposed adjacent to the channel-shaped member such that the adjustable stop can be moved into a first position corresponding to a standard mode where it blocks the opening and a second position corresponding to an extended mode where it allows the head rail to extend beyond the stop. A first scale is disposed on the horizontal support member for operation in a standard mode. A second scale is disposed on the horizontal support member for operation in an extended mode.

In a second aspect of the invention, the U-shaped channel member is open at both ends, and there is only one scale. An adjustable stop providing the functions described above also functions as a restraining member to hold the head rail in position in the channel-shaped member.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 1:
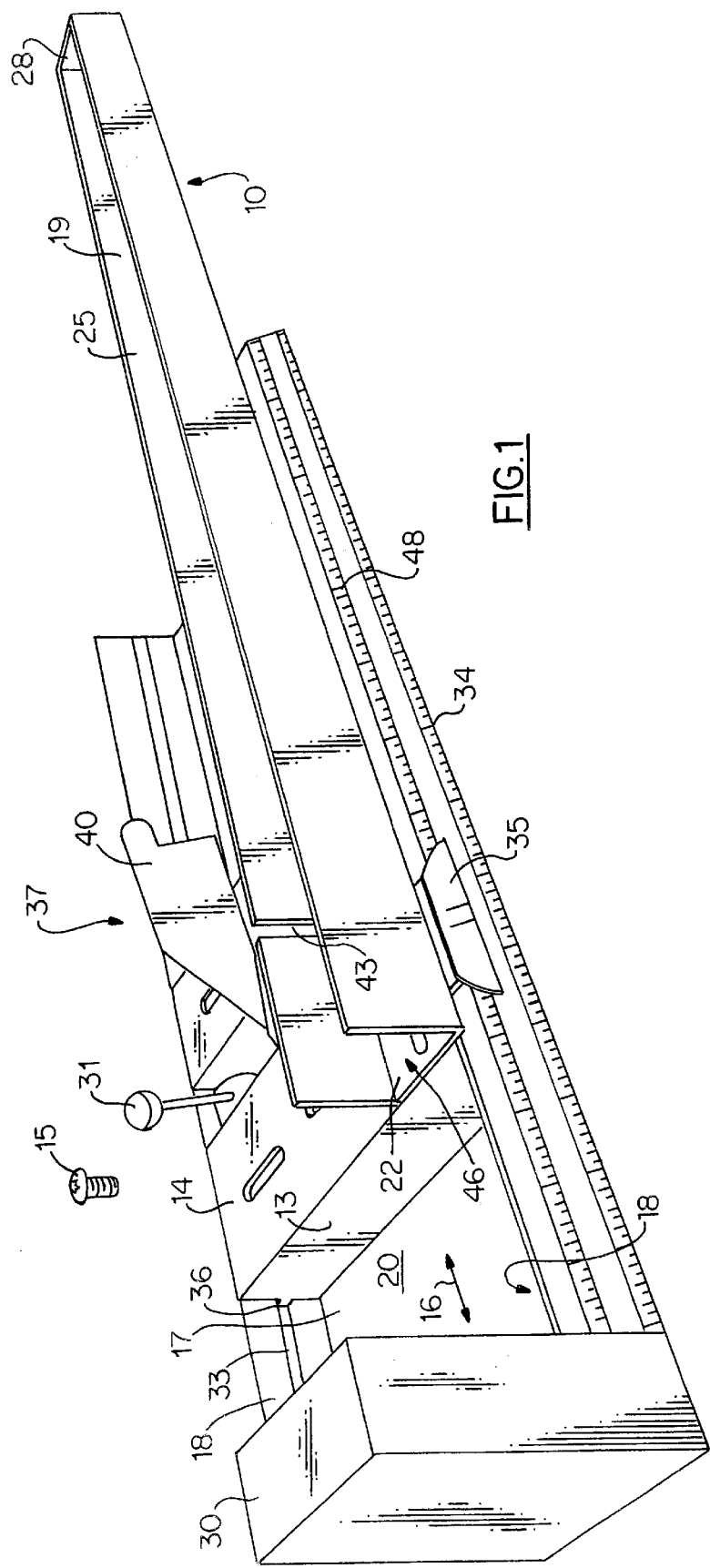
FIG. 1 is a perspective view of the head rail holder of the present invention; and, FIG. 2 is a perspective view of an alternate embodiment of the head rail holder of the present invention.

Referring to FIG. 1, a head rail holder 10 attaches to a pair of sliding stabilizer blocks 13. The head rail holder 10 is attached to the blocks 13 by a pair of plates 14. The plates 14 are attached to the blocks 13 by fasteners 15 such as screws or the like. The stabilizer blocks 13 travel along a pathway 16 that is formed in a horizontal support member 17 having a pair of side walls 18 and a bottom wall 20. The stabilizer block 13 supports the U-shaped channel 19 that provides support for a head rail to be cut. The U-shaped channel 19 is constructed out of a material such as aluminum, other metals, plastic, composites or the like. The channel 19 has a bottom wall 22, a pair of opposed side walls 25, and an end wall 28. The channel 19 of the holder 10 is adapted to receive a head rail (not shown). The head rails for vertical blinds are typically elongated slender members that require a blind trimming machine 30 and a scale 34 for cutting to custom lengths. An example of a cutting machine 30 for cutting head rails is a Shade-O-Matic™ brand blind trimming machine available from Shade-O-Matic Limited in Toronto, Ontario, Canada. An example of a blind trimming machine is disclosed in U.S. Pat. No. 5,806,394 which is incorporated herein by reference.

The sliding stabilizer blocks 13 slide in the pathway 16. The side walls 18 may be provided with a groove 33 that cooperates with a rib 36 on the side of the stabilizer block 13. Other arrangements for retaining the block in the pathway 16 would also be suitable. The stabilizer block 13 can be locked into a fixed position along the pathway 16 by operation of a lever 31 that actuates a cam (not shown) to lock the stabilizer block 13 into position as known to those of ordinary skill in the art. The stabilizer blocks 13 with cam lock 31 are provided on existing Shade-O-Matic blind trimming machines, and therefore will not be described in detail.

With reference to the orientation in FIG. 1, the die cutting portion of the blind trimming machine 30 is positioned on the left-hand side of the figure and is represented schematically because it is known to those of ordinary skill in the art.

A standard tape measure 34 is disposed along the length of the horizontal support member 17 to indicate the distance from the cutting dies on the cutting machine 30 to the end of the head rail.

A gauge 35 attached to the head rail holder 10 provides a mark corresponding to the end of the head rail in standard mode. The gauge 35 is constructed of a transparent material such as clear plastic so that the scale can be viewed through it.

The present invention may be converted from a standard to an extended head rail holder 10 by positioning an adjustable stop 37 in one of two positions. When the adjustable stop 37 is moved downward from the position shown in FIG. 1, the head rail holder 10 is in the standard operational mode for cutting shorter head rails. In FIG. 1, the adjustable stop 37 comprises a pivoting gate 40 that rotates about a pivot point. The side wall 25 has a slot 43 adapted to receive the pivoting gate 40 such that the gate 40 can be pivoted between a first position and a second position. In the first position, the gate blocks the opening 46 in the front of channel 19.

When the gate 40 is rotated upward with respect to the orientation of FIG. 1, the head rail holder accommodates longer head rails. In this extended mode, a second tape measure 48 compensates for the extra length of the extended head rail holder by offsetting the second tape 48 by an amount equal to the distance from the gate 40 to the end wall 28 of the extension. Accordingly, in the standard mode the tape measure 34 provides a measurement of the actual length of the head rails. In the extended mode, the initial value for the tape measure 48 equals the length from the gate 40 to the end wall 28 of the extension. Accordingly, if the distance between the gate 40 and the end wall 28 is twenty-six inches long then the initial value for the second tape is twenty-six inches. As a result of this offset, the operation of the stabilizer blocks 13 still occurs within the span of the structural rack even for oversized head rails. Accordingly, the system accommodates oversized head rails with the same operation. The only additional space requirement for the system is that the structural rack has to be provided with an opening at the end so that the head rail holder extension can extend beyond the end of the rack. The extended head rail holder 10 is elevated from the base and is normally positioned inside the rack far enough that it will not be obstructed by the post on the end support of the structural rack.

Figure 2:
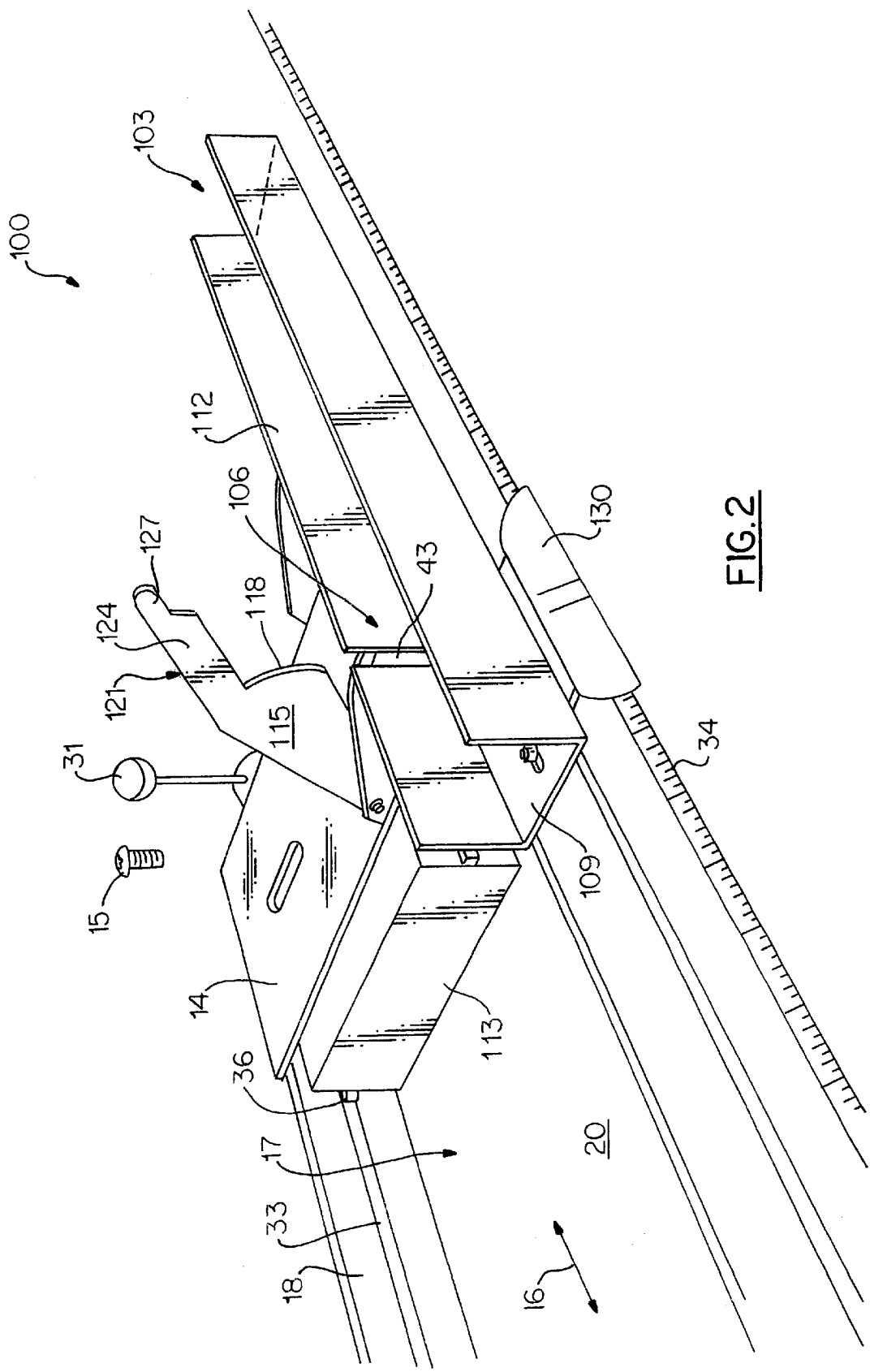

Turning to FIG. 2, an alternate embodiment of the present invention is shown. Those details which have equivalents in FIG. 1 have been given the same reference numbers. A head rail holder 100 has openings at both ends. The head rail holder 100 is attached to the sliding block 113 by one of the plates 14. The plate 14 is attached to the block 113 by fasteners 15 such as screws or the like. The sliding stabilizer block 113 travels in the pathway 16 as described above. The head rail holder extension 100 is in the shape of a U-channel 103 that is constructed of a material such as aluminum, other metals, plastic, composites or the like, and is open at opposite ends. The channel 103 is formed by a bottom wall 109 and a pair of opposed side walls 112.

The alternate embodiment is also capable of converting between a standard mode and an extended mode by means of an adjustable stop. A pivoting arm 115 has a cam surface 118 and a horizontal portion 121 having a wider section 124 terminating in a lift tab 127. In the standard mode for head rails up to seventy-eight inches, the horizontal portion 121 rotates into the channel 106 such that the wider section 124 of the horizontal portion 121 blocks the channel 106 and the lift tab 127 overhangs the side wall 112.

In the extended mode, the pivoting arm 115 is rotated with a head rail positioned inside the channel 106 such that the cam surface 118 engages with the head rail to restrict movement of the head rail in the channel 106 by means of friction. As known to those of skill in the art, other devices such as screw clamps, spring clamps, frictional devices, or the like could be substituted for the pivoting cam surface that is shown. In the extended mode, the head rail extends out of the open end, and the device can therefore accommodate an infinite number of head rail lengths.

The operation of the device in the extended mode is as follows. The head rail is pre-marked on the outside at a reference length such as seventy-eight inches. The head rail is restricted from movement in the head rail holder such that the gauge 130 corresponds to the reference length (seventy-eight inch mark) on the head rail. Next, a conversion table is used to determine the proper length for cutting the head rail. For example, if the head rail is one hundred and four inches long and the desired length of the custom head rail is ninety-three inches, then the head rail is cut at the sixty-seven inch mark on the scale 34.

Conversion tables can be constructed for the extended mode through use of the following formula:

((Reference Length)−(actual length of head rail minus desired length of head rail))=value for cutting For the above example, the formula yields the following:

78−(104−93)=67.

The value seventy-eight is used as a reference length for an example, however, other lengths of head rail could also be used as the reference length.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A head rail holder extension, comprising:
   a horizontal support member;
   a sliding stabilizer block adapted to move along the horizontal support member and adapted to be locked at positions along the length of the horizontal support member;
   an elongate channel-shaped member having a bottom wall and two side walls disposed substantially parallel to at least one scale, the channel-shaped member having an opening for receiving a head rail and being attached to the stabilizer block;
   an adjustable stop disposed adjacent to the channel shaped member such that the adjustable stop can be moved into a first position where it blocks the opening and a second position where it allows the head rail to extend beyond the stop; and,
   the at least one scale disposed on the horizontal support member.

2. The head rail holder extension of claim 1, wherein the adjustable stop comprises a pivoting gate.

3. The head rail holder extension of claim 2, wherein the pivoting gate further comprises a cam surface.

4. The head rail holder extension of claim 2, wherein the pivoting gate further comprises a wider section terminating in a lift tab that is narrower than the wider section.

5. The head rail holder extension of claim 1, wherein the channel-shaped member terminates in an end wall.

6. The head rail holder extension of claim 1, wherein the channel-shaped member is open at opposite ends.

7. The head rail holder extension of claim 1, further comprising:
   a sidewall of the channel-shaped member having a slotted opening to receive the adjustable stop.

8. A head rail holder extension comprising:
   a horizontal support member;
   a sliding stabilizer block adapted to move along the horizontal support member and adapted to be locked at positions along the length of the horizontal support member;
   a channel-shaped member having an opening and being attached to the stabilizer block, wherein the channel-shaped member terminates in an end wall;
   an adjustable stop disposed adjacent to the channel shaped member such that the adjustable stop can be moved into a first position where it blocks the opening and a second position where it allows a head rail to extend beyond the stop;
   a first scale disposed on the horizontal support member; and
   a second scale, wherein an endpoint of the second scale is offset from zero by an amount equal to about the distance from the adjustable stop to the end wall of the channel-shaped member.

9. The head rail holder extension of claim 1, wherein the stabilizer block locks into position through the operation of a cam operated by a lever.

10. The head rail holder extension of claim 1, further comprising: a length gauge disposed such that a measurement of length can be read from the at least one scale.

* * * * *